United States Patent [19]

Nakamura

[11] 4,032,790
[45] June 28, 1977

[54] X-RAY FILM CARTRIDGE

[75] Inventor: Takeshi Nakamura, Minami-ashigara, Japan

[73] Assignee: Fuji Photo Film Co., Ltd., Minami-ashigara, Japan

[22] Filed: May 3, 1976

[21] Appl. No.: 682,400

[30] Foreign Application Priority Data

May 12, 1975 Japan ............................. 50-63466
Jan. 30, 1976 Japan ............................. 51-9291

[52] U.S. Cl. ............................. 250/480; 250/481
[51] Int. Cl.$^2$ ..................... A61B 6/00; G03B 41/16
[58] Field of Search .................... 250/475, 480, 481

[56] References Cited
UNITED STATES PATENTS 3,958,125  5/1976  Zechmair et al. ................. 250/480

Primary Examiner—Paul L. Gensler
Assistant Examiner—T. N. Grigsby
Attorney, Agent, or Firm—Gerald J. Ferguson, Jr.; Joseph J. Baker

[57] ABSTRACT

An X-ray film cartridge composed of a rectangular cartridge body and a rectangular cover hinged to the body. The cover is locked by means of a pair of latches mounted to one side of the cover opposite to the side hinged to the body. The cover is deformed to be convex on the inside and is made of elastic material. The cover has a cushion pad on the inner surface to uniformly push an intensifying sheet against an X-ray film in the cartridge. The cushion pad is provided with a number of perforations to improve the distribution of pressure thereof on the X-ray film.

4 Claims, 7 Drawing Figures

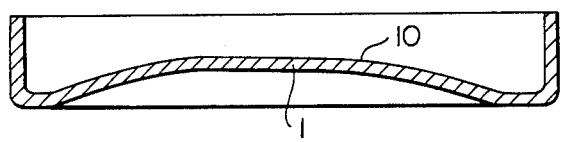
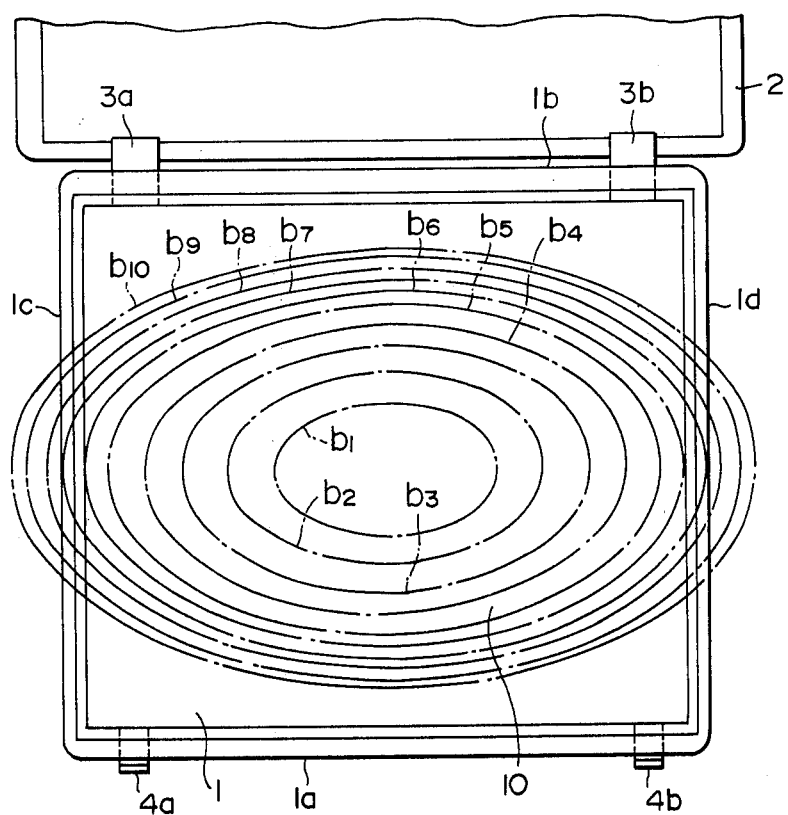
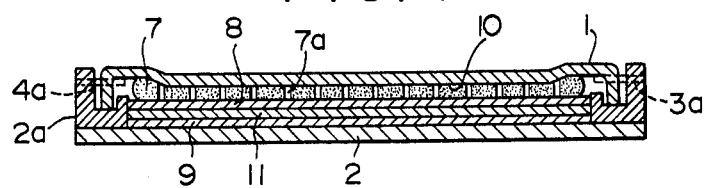

X-RAY FILM CARTRIDGE

BACKGROUND OF THE INVENTION

1. Field of the Invention

This invention relates to an X-ray film cartridge, and more specifically to an X-ray film cartridge which contains a sheet of X-ray film interposed between a pair of intensifying sheets and is used in a radiographic camera.

2. Description of the Prior Art

As prescribed by JIS Z4909 (1972), an X-ray film cartridge is composed of a cartridge body of rectangular shape, a cover hinged to the body, and a pair of intensifying sheets retained therein to interpose therebetween an X-ray film. A cushion pad is interposed between the cover and one intensifying sheet attached to the cover so as to press the intensifying sheet against the X-ray film. The cover is of rectangular shape and has hinge means on one side edge thereof and latch means on the opposite ends thereof. The hinge means is usually composed of a pair of hinges to pivotally mount the cover at one side thereof to the body, and the latch means is usually composed of a pair of latches slidably mounted to the cover to be engaged with a pair of slots provided in one side wall of the cartridge body. Therefore, the hinged cover is held to the cartridge body at four points.

The above described conventional X-ray film cartridge has a defect in that the central portion of the cover is not sufficiently pressed against the body and accordingly the central portion of the intensifying sheet is not in perfect contact with the X-ray film. Therefore, an uniformly sharp radiographic image are difficult to obtain with the conventional X-ray film cartridge.

SUMMARY OF THE INVENTION

The primary object of the present invention is to provide an X-ray film cartridge in which a cushion pad attached to the cover of the cartridge is put into uniform contact with the X-ray film loaded therein.

Another object of the present invention is to provide an X-ray film cartridge which is able to obtain a sharp image with a simple structure.

The X-ray film cartridge in accordance with the present invention is characterized in that the cushion pad attached to the cover hinged to the cartridge body is provided with a number of perforations, and that the cover is deformed to be convex on the inside. The cover is made of elastic material so as to be flattened when the cover is closed with an X-ray film loaded in the cartridge. The X-ray film cartridge is of rectangular shape and has a pair of hinge means on one side thereof and has a pair of latch means on the opposite side thereof.

More particularly, the film cartridge in accordance with the present invention is characterized in that the cover thereof is deformed to be convex on the inside and the contour lines of the convex inner surface are elliptical.

The contour of the inner surface of the cover and the structure of the cushion pad cooperate to uniformly press the intensifying sheet attached to the cover against the X-ray film loaded in the cartridge.

BRIEF DESCRIPTION OF THE DRAWING

FIG. 2 is a cross-sectional view of the cover of the X-ray film cartridge in accordance with the present invention, FIG. 3 is a plan view of said cover, FIG. 4 is a cross-sectional view of the X-ray film cartridge in accordance with the present invention with the cover closed.

DESCRIPTION OF THE PREFERRED EMBODIMENTS

Figure 1:
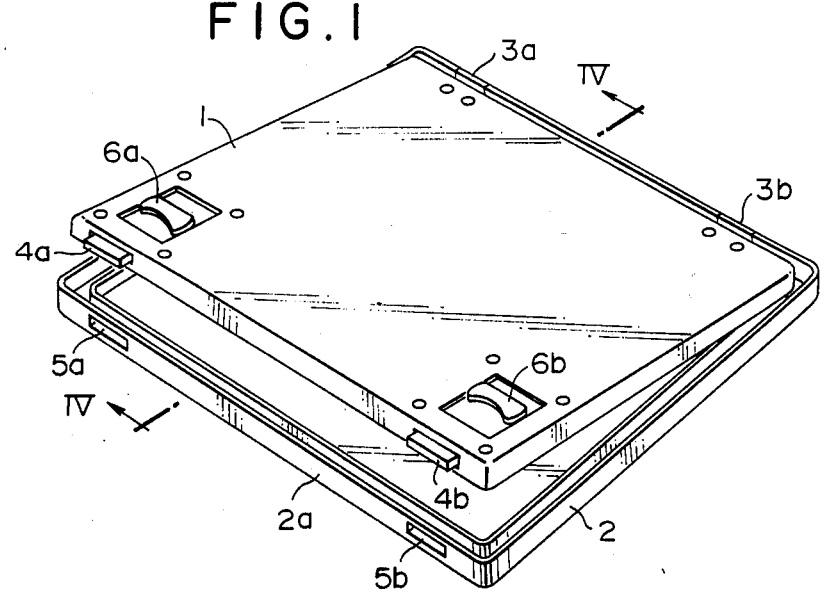
FIG. 1 is a perspective view of an embodiment of the X-ray film cartridge in accordance with the present invention with the cover partially opened.

Referring to FIG. 1 which shows an embodiment of the X-ray film cartridge in accordance with the present invention, a rectangular cover 1 is hinged to a rectangular cartridge body 2 at hinges 3a and 3b provided on one side thereof. The cover 1 is provided with a pair of latches 4a and 4b to be engaged with a pair of slots 5a and 5b provided in one side wall 2a of the cartridge body 2. On the cover 1 are provided manually operable latch operating levers 6a and 6b for releasing the latches 4a and 4b from the slots 5a and 5b, respectively. The latches 4a and 4b are spring urged to be engaged with the slots 5a and 5b.

The cover 1 is shaped, as shown in FIGS. 2 and 3, to be convex on the inside. The contour of the convex surface 10 of the cover 1 is such that the contour lines thereof $b1, b2 \ldots b10$ are in the form of concentric ellipses and the center of the ellipses is located at the center of the cover 1 of rectangular shape. The major axis of the ellipses $b1$ to $b10$ is oriented in the direction of the longer sides 1a and 1b, and the minor axis of the ellipses is oriented in the direction of the shorter sides 1c and 1d of the cover 1.

The contour of the convex surface 10 of the cover 1 is determined so that the cover 1 is subjected to uniform pressure when the cover 1 is closed and locked by the latches 4a and 4b. According to experiments conducted by the inventor, the contour of the cover 1 which is most appropriate for applying uniform pressure on the film in the cartridge approximately complies with Grashof's theory. The cross-section of the inside surface 10 of the cover 1 has a curve represented by an equation of fourth power or a curve similar thereto.

The cartridge cover 1 has on its inner surface 10 a cushion pad 7 made of foamed urethane and an intensifying sheet 8 attached to the surface of the cushion pad 7 as shown in FIG. 4. The cartridge body 2 has on its inner surface another intensifying sheet 9 and an X-ray film 11 is interposed between said two intensifying sheets 8 and 9. The cushion pad 7 can be made of sponge, rubber, felt or the like. the cushion pad 7 has a function to uniformly press the intensifying sheet 8 against the X-ray film 11.

Figure 5:
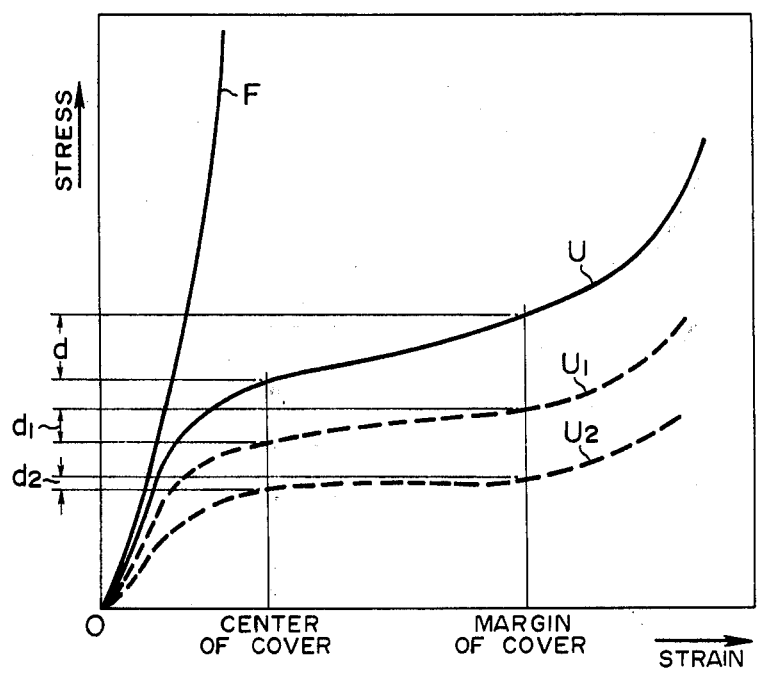
FIG. 5 is a stress-strain diagram which shows the stress-strain relationship of various materials used as the cushion pad in the X-ray film cartridge.

In order to effect a uniform pressure distribution over the whole area of the cover 1, the cushion pad 7 is desired to have as flat stress-strain relationship as possible. If the stress-strain relationship is flat, which means that the material is greatly strained by a small stress, there is little difference in stress between the central portion and the marginal portion of the cover 1. Referring to FIG. 5 which shows stress-strain diagrams of various materials, curve F represents the stress-strain relationship of felt and curves U, U1, and U2 represent the stress-strain relationship of various kinds of foamed urethane pads. Curve U is the curve for a solid pad of foamed urethane and the curves U1 and U2 are the curves for foamed urethane pads having perforations. The pad represented by curve U1 has perforations of smaller diameter than that of the perforations of the pad represented by curve U2. The stress-strain diagrams shown in FIG. 5 show that the foamed urethane pads have a more desirable stress-strain relationship than felt, and that the foamed urethane pads having perforations are more advantageous than the foamed urethane pads without perforations. The difference $d$ shows the difference in stress between a point at the center of the cover 1 and a point in the marginal portion of the cover 1 of the cushion pad 7 made of a solid sheet of foamed urethane pad. The difference $d2$ which is very small shows that the difference in stress between the center and the margin of the foamed urethane pad having a number of comparatively large perforations is very small.

Figure 6:
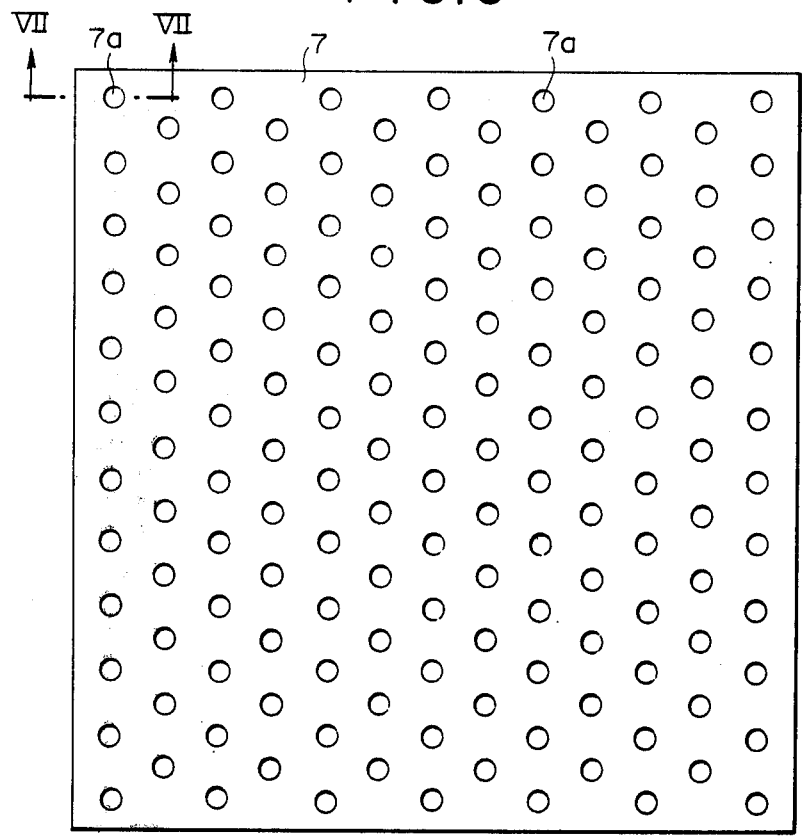
FIG. 6 is a plan view of a cushion pad employed in one embodiment of the present invention.
Figure 7:
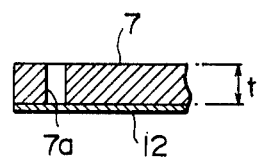
FIG. 7 is a partial enlarged cross-sectional view showing a part of the cushion pad employed in one embodiment of the present invention.

From the above results, it can be said that the foamed urethane cushion pad having a number of perforations functions to impart a uniform pressure on the X-ray film interposed between the intensifying sheets 8 and 9. A cushion pad 7 having a number of perforations 7a is shown in FIGS. 6 and 7. The cushion pad 7 has a number of perforations 7a distributed regularly at equal intervals. The diameter of the perforations 7a and the density thereof are determined taking the kind and thickness of the cushion pad material into consideration. Usually, the larger is the size of the pad 7, the larger is the diameter of the perforations 7a. For instance, when the thickness of the cushion pad 7 is about 9mm and perforations are provided in the cushion pad 7 with the density of $1/10cm^2$, the desirable diameter of the perforations 7a is 18mm. When the density is $2/10cm^2$, the diameter is perferably 10mm. As shown in FIG. 7, an adhesive tape 12 is attached to one surface of the cushion pad 7 to attach the pad to the inner surface 10 of the cover 1.

The height of the convex surface 10 of the cover 1 is, for instance, set to be about 4mm when the thickness of the cushion pad 7 is about 8.5mm. The ratio of the major axis to the minor axis is preferably set to be about 7:4 when the ratio of the longer side to the shorter side of the cover 1 is about 6:5, e.g. 302mm × 252mm.

Although the perforations 7a have been described to be through holes, it will be noted that they may be blind holes.

I claim:

1. An X-ray film cartridge comprising in combination: a rectangular cartridge body having a front wall, pair of side walls and a back wall; a rectangular cover hinged at one side thereof to the back wall of said body by means of a pair of hinge means; a pair of latch means provided at one side of said cover opposite to the hinged side, said latch means being manually operable to be moved from a latching position to a released position; a pair of slots provided in the front wall of the body to be engaged with said latch means of the cover; a cushion pad made of elastic material attached to the inner surface of the cover; an intensifying sheet attached to the surface of the cushion pad; and a second intensifying sheet attached to an inner surface of the body; wherein the improvement comprising a number of holes provided in said cushion pad and a convex part provided in said cover, said convex part of the cover being convex to the inside and having a contour represented by concentric elliptical contour lines whose center is located at the center of the rectangular cover.

2. An X-ray film cartridge as defined in claim 1 wherein said cushion pad is made of foamed urethane form.

3. An X-ray film cartridge as defined in claim 1 wherein said holes are through holes.

4. An X-ray film cartridge as defined in claim 1 wherein said holes are blind holes.

* * * * *